April 9, 1968     F. A. G. TIMMERMANS     3,376,737
ELECTRONIC FUEL CONSUMPTION INSTRUMENT
Filed Oct. 26, 1964     2 Sheets-Sheet 2

INVENTOR.
Frederick A. G. Timmermans
BY Watson, Cole Grindle & Watson
ATTORNEYS

United States Patent Office 3,376,737
Patented Apr. 9, 1968

3,376,737
ELECTRONIC FUEL CONSUMPTION INSTRUMENT
Frederik A. G. Timmermans, Rottekade, Netherlands, assignor, by mesne assignments, to Conoflow Europa N.V., Ede, Netherlands, a company of Netherlands
Filed Oct. 26, 1964, Ser. No. 406,258
Claims priority, application Netherlands, Nov. 11, 1963, 300,350
5 Claims. (Cl. 73—114)

ABSTRACT OF THE DISCLOSURE

This invention relates to improved instruments for indicating the fuel consumption of vehicles wherein first signal generator means are provided for generating a signal having a magnitude proportional to the velocity of the vehicle. Second signal generator means are included for generating spaced pulse signals, the duration of the pulses and interval between the pulses being inversely proportional to the quantity of fuel per unit time being consumed by the vehicle. Storage means are provided for intergrating and retaining the signal from the first signal generator means, the storage means being controlled by switching means which are responsive to the pulse signals from the second signal generator means. Measuring means periodically sample the signal retained by the storage means to provide an indication of the fuel consumed by the vehicle. The storage means are controlled in a progressive cycle which includes a charging period during which the signal from the first generating means is stored, a discharging period during which the stored signal is removed from the storage means, and a period during which the storage means are connected to the measuring means for indicating the fuel consumption.

---

The invention relates to an instrument for measuring and indicating the fuel consumption of vehicles, the instrument having a tachogenerator, the terminals of which are connected to an electric circuit, which generates electric signal proportional to the velocity of the vehicle. A fuel gauge is adapted to provide a sigal representing a fixed ratio of the quantity of fuel consumed by the vehicle per unit of time and which is incorporated in the electric circuit. Storage and integrating means are included for the processing of the two signals to measure the fuel consumption. The quantity of fuel consumed is indicated by a suitable meter.

In known gas consumption measuring instruments the tachogenerator normally generates a pulse signal, the frequency of which is proportional to the velocity of the vehicle and from which is derived an electric voltage, which varies in magnitude with the pulse frequency.

The fuel gauge is provided with a transmitter.

The voltage derived from the pulse frequency is subjected, either to an operational amplifier, the amplification of which is varied by the transmitter, or into a circuit, the resistance of which is varied by the transmitter. The output signal of the amplifier, or the current in the circuit respectively, are read on an ampere meter, which is calibrated in kilometres per litre.

It is the object of the invention to provide improved mean for measuring the instantaneous fuel consumption of a vehicle.

For this purpose the invention is characterized in that the fuel gauge is a flow meter having a shaft which rotates in dependence on the velocity of flow of the fuel and is provided with an interrupter driven by the shaft. The interrupter generates a pulse signal wherein the duration of the pulses and interval between pulses is inversely proportional to a quantity of fuel passing through the fuel gauge per unit of time. The storage and integrating means comprises at least one condenser, which integrates a current magnitude representative of each pulse. The measuring means periodically ascertains the charge of the condenser and provides an indication of the fuel consumed.

As will hereinafter be demonstrated in an embodiment of the invention, it is advantageous to employ two condensers in the storage and indicating means, each of which can be charged, measured and discharged in a progressive cycle, in which the measuring period of one condenser always coincides with the charging- and discharging-period of the other condenser. A voltmeter is preferably provided in the measuring circuit, which alternately indicates the potentials of the one and then of the other condenser.

The ratio of the opening- and closing-times of the interrupter may exclusively determine the charging-, measuring- and discharging-times of the condensers. By the opening- or closing-time of the interrupter is meant the time, during which the interrupter is open or closed.

The said ratio is influenced by the mechanical construction of the interrupter. This influence may be eliminated by having the interrupter control a pulse-divider relay, which only rises and falls off, either always when the interrupter is being closed, or always when it is being opened.

In a preferred embodiment of the invention, the condensers are charged from a battery via a transistor, which is controlled at its base by pulses formed in a control circuit. The control circuit may comprise the pulse-divider relay which controls a relay multivibrator to provide control of the charges stored by the condensers.

The invention will hereinafter be further elucidated with reference to the accompanying drawing of an embodiment of the invention.

Figure 1:
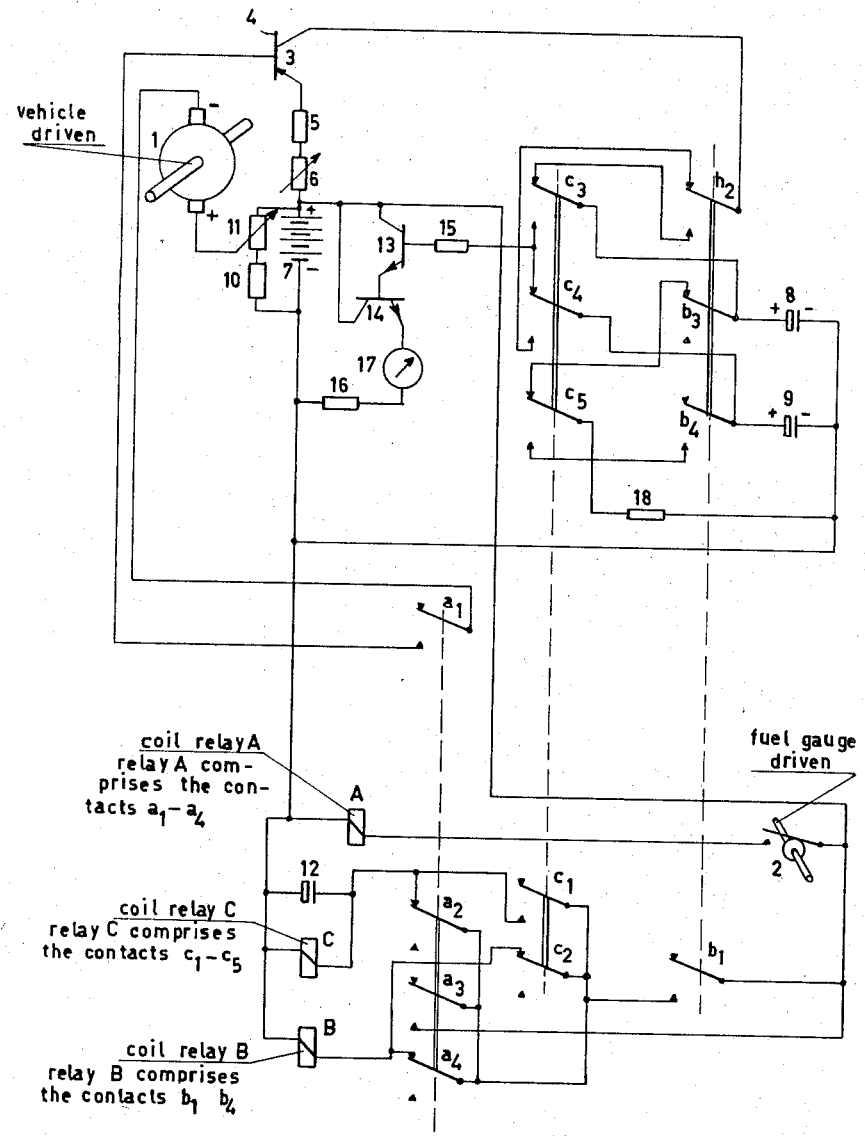
FIGURE 1 shows a diagram of an embodiment according to the invention.

With reference to FIGURE 1, tachometer 1 is connected to be driven by the wheels of a vehicle to generate an electrical signal proportional to the velocity of the vehicle. Transistor 3 is connected as an emitter follower and provides a current signal output at its collector which is proportional to the tachometer voltage signal which is applied at its base. Emitter resistances 5 and 6 are selected to provide the desired current output from the collector of transistor 3 in accordance with the voltage generated by tachometer 1 and the battery supply voltage provided by battery 7. The voltage output of tachometer 1 is determined by voltage divider network comprising resistances 10 and 11. The tachometer voltage is adjustable by means of variable resistance 11.

Figure 2:
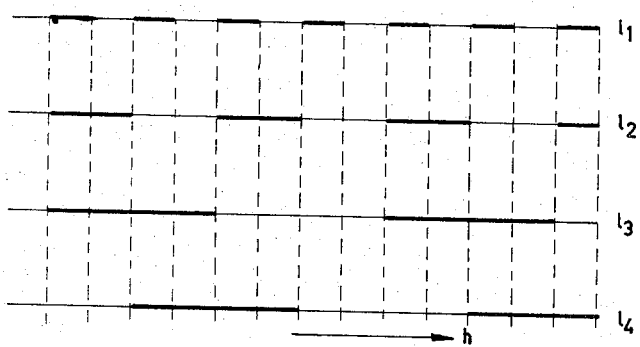
FIGURE 2 illustrates typical signals generated by the interrupter, pulse divider relay and multivibrator.

Interrupter 2 is driven by the shaft of the fuel gauge to provide a train of pulses having a pulse width and a pulse interval which is inversely proportional to the fuel consumption per unit time. Pulse divider relay A, including contacts $a_1, a_2, a_3, a_4$, is responsive to the output of interrupter 2 to divide the pulse output therefrom. Waveform $L_1$ of FIGURE 2 shows the pulse train output of interrupter 2 for a constant fuel consumption condition of the vehicle. Relay A is activated by the pulses to produce a waveform $L_2$. The activation of relay A causes contacts $a_1$–$a_4$ to be switched to the lower set of contacts shown in FIGURE 1.

Relays B, C include contacts $b_1$–$b_4$ and contacts $c_1$–$c_5$.

respectively. Relays B and C and condenser 12 form a multivibrator circuit. Contacts $b_1$–$b_4$ and contacts $c_1$–$c_5$ are thereby caused to be opened and closed as shown by waveform $L_3$ of FIGURE 2, indicating the periods during which relay B is excited, and waveform $L_4$ indicating the periods during which relay C is activated.

Condensers 8, 9 comprise storage elements which are cyclically charged, discharged and connected to a measuring means which will be more fully described hereinafter. Condensers 8 and 9 are cyclically connected to be charged by the current output from the collector of transistor 3, discharged through resistor 18 which is connected to the common node point of the condensers and to the negative terminal of battery 7, and connected to the measuring means for indicating their stored voltages. The alternate cycling is accomplished in accordance with the opening and closing of relay contacts $b_3$, $b_4$, $c_3$, $c_4$ and $c_5$ which are in turn activated by the aforementioned operation relays B and C. From the waveforms shown in FIGURE 2 it is apparent that the above cycling of condensers 8 and 9 is such that when condenser 8 is being discharged (as shown in FIGURE 1) the voltage stored in condenser 9 is being applied to the measuring circuit. Furthermore, the measuring period of one condenser always coincides with the charging and discharging period of the other condenser to alternately indicate by means of the measuring circuit the potentials of the one and then of the other condenser.

Transistors 13 and 14, along with resistances 15 and 16 and voltmeter 17, comprise the measuring and indicating means. As described above, the stored values of condensers 8 and 9 are alternately applied to the base of transistor 13. Transistor 14 provides means for amplifying the current values of the signals at the base of transistor 13 which is then measured by voltmeter 17. The scale of voltmeter 17 is preferably calibrated to read in miles per gallon.

Figure 3:
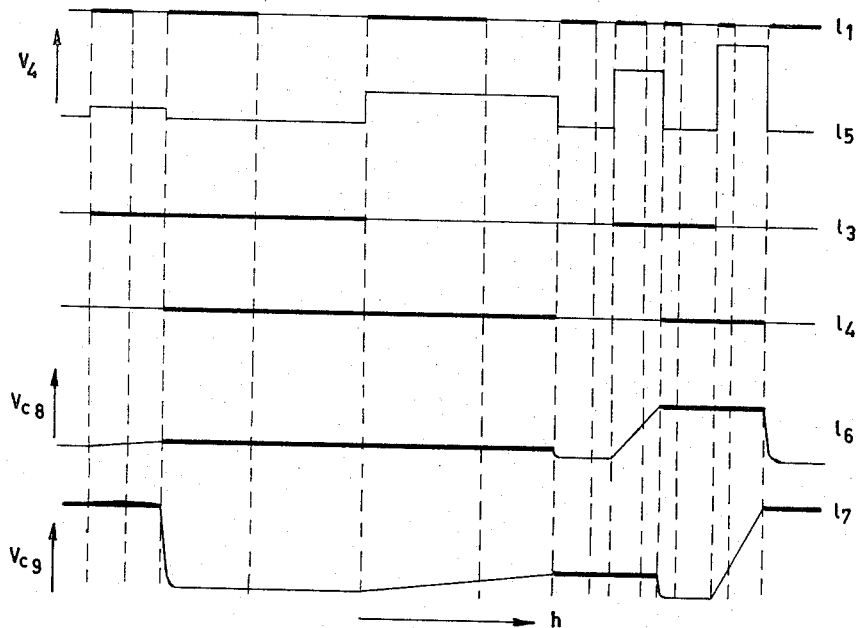
FIGURE 3 shows typical signals, including the charging and discharging of the condensers, for a condition when the vehicle is consuming a variable quantity of fuel.

FIGURE 3 illustrates typical waveforms in the circuitry shown in FIGURE 1 for a condition where the fuel consumption is variable. Waveform $L_1$ represents the pulse train output of interrupter 2. Waveform $L_5$ represents the tachometer voltage output which is applied to the base of transistor 3 only during those portions of the period when contact $a_1$ is closed. Waveforms $L_3$ and $L_4$, respectively, represent the activation of relays B and C. Waveforms $L_6$ and $L_7$ indicate the alternate charging and discharging of condensers 8 and 9, respectively.

In the subjoined table the values of the elements used in the embodiment of the invention are quoted.

1—Generator, (1.1 volt per 1000 revolutions per minute)
2—Interrupter, reed relay mounted on fuel gauge (1 revolution of the central shaft corresponds to 3.75 cubic centimetres of passed fuel)
3—Transistor, Philips, O.C. 71.
5—Resistance, 1000 ohms.
6—Potentiometer, 1000 ohms.
7—Accumulator, 6 volts.
8/9—Condenser, 1000 microfarads.
10—Resistance, 1000 ohms.
11—Potentiometer, 100 ohms.
12—Condenser, 8 microfarads.
13/14—Transistor, Philips, O.C. 140.
15—Resistance, 1000 ohms.
16—Resistance, 10,000 ohms.
17—Meter, 1 milliampere.
A—Relay, contacts, 2 connecting, 3 disconnecting ones, mark Siemens type Trls 6 ATBv 62012/89e–79q.
B—Relay, contacts, 2 connecting, 1 disconnecting, 1 switchover contact, mark Siemens Trls 154d TBv 65418/93e.
C—Relay, contacts, 1 connecting, 1 disconnecting, 3 switchover contacts, mark Siemens Trls 154d TBv 65418/93e.

In describing the embodiment of the invention reference has been made throughout to a supply meter for a vehicle.

The term vehicle should also comprise, for instance, a vessel or the like, in which case the tachogenerator can be connected to the log.

I claim:
1. An instrument for indicating the fuel consumption of a driven vehicle, in combination, comprising:
 first signal generator means for generating a first signal having a magnitude proportional to the velocity of the vehicle,
 second signal generator means for generating spaced pulse signals, the duration of the pulses and interval between the pulses being inversely proportional to the quantity of fuel per unit time being consumed by the driven vehicle the amplitude of the pulses being proportional to the first signal,
 storage means for storing and retaining the pulses,
 switching means responsive to the pulse signals for controlling the storage of the signal from the first signal generator means by the storage means and,
 measuring means controlled by the switching means for indicating the signal retained in the storage means.

2. An instrument according to claim 1 wherein the switching means includes pulse divider means for dividing the spaced pulse signals and multivibrator means responsive to the pulse divider means for controlling the signal retained in the storage means.

3. An instrument according to claim 2 wherein the storage means includes first and second storage elements, the multivibrator means controls the first and second storage elements in a progressive cycle, the cycle including a charging period when the first and second storage elements alternately store the pulses, a discharging period during which the stored signal is removed from the first or second storage element, and a period during which the first or second storage element is respectively connected to the measuring means.

4. An instrument according to claim 3 wherein the switching means further includes current divider means for providing a current having an amplitude proportional to the signal from the first signal generator means and the first and second storage elements are capacitors.

5. An instrument according to claim 4 wherein the pulse dividing means consists of a pulse divider relay and the multivibrator means consists of a pair of switching relays interconnected to be alternately in a closed and opened position.

References Cited

UNITED STATES PATENTS 2,920,274  1/1960  Gustafsson _____ 324—111 X
2,941,397  6/1960  Lee _____ 73—114

RICHARD C. QUEISSER, *Primary Examiner.*

J. W. MYRACLE, *Assistant Examiner.*